Aug. 26, 1947.　　　　A. E. YOUNG　　　　2,426,545
POTATO DIGGER AND CLUTCH THEREFOR
Filed April 26, 1945　　　4 Sheets-Sheet 1
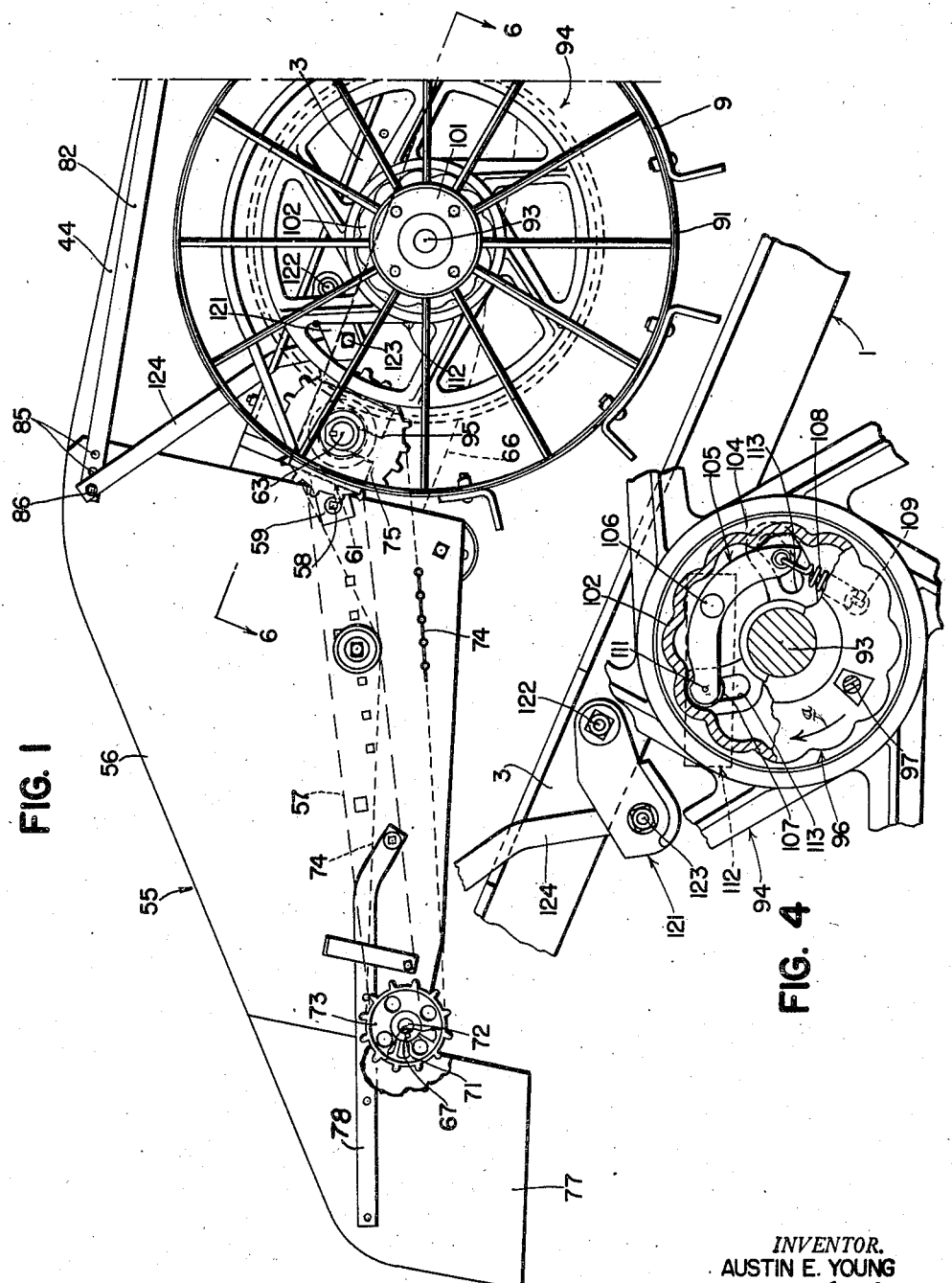
*INVENTOR.*
AUSTIN E. YOUNG
WITNESS
BY 
ATTORNEYS

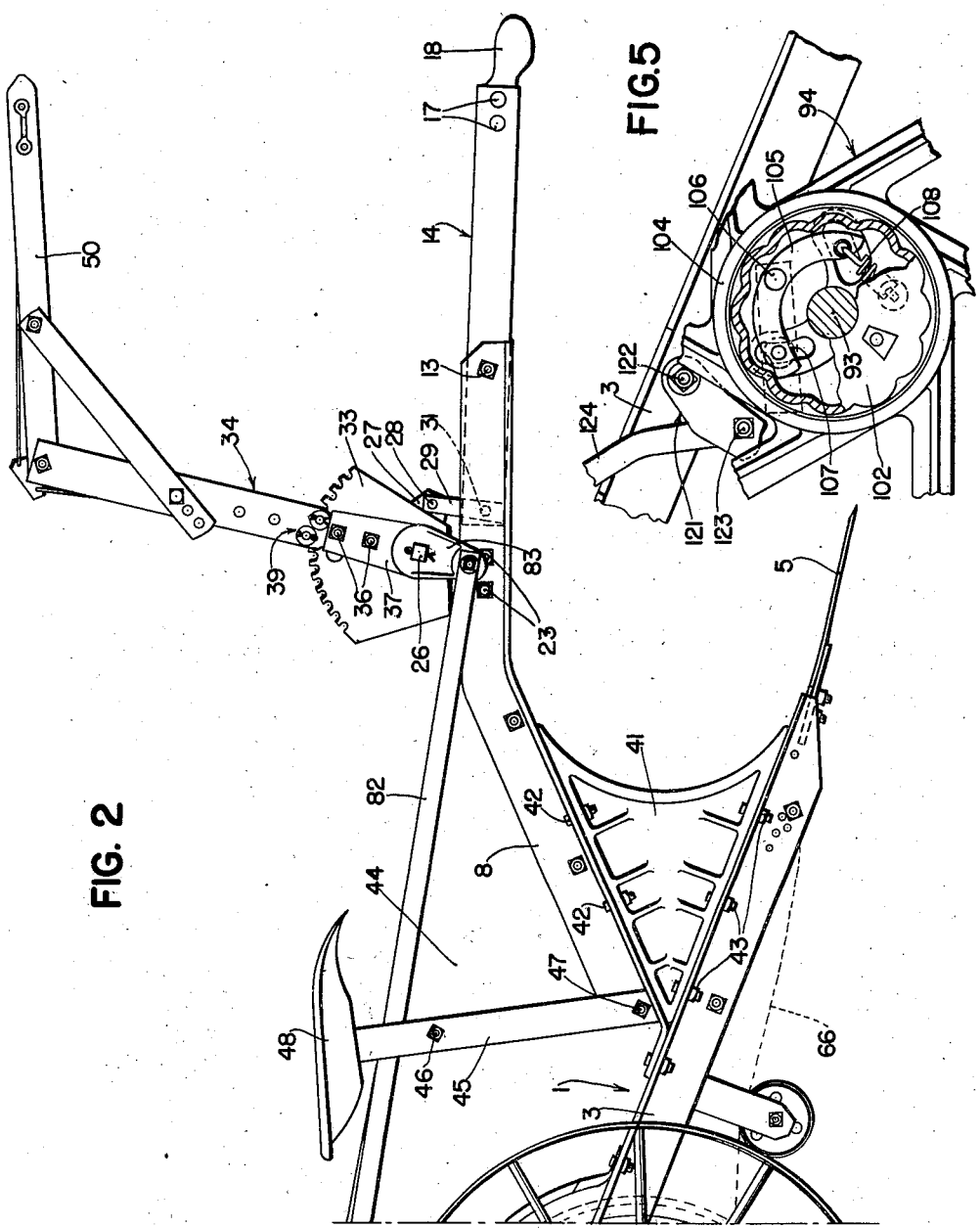

Aug. 26, 1947.  A. E. YOUNG  2,426,545
POTATO DIGGER AND CLUTCH THEREFOR
Filed April 26, 1945   4 Sheets-Sheet 3

WITNESS

INVENTOR.
AUSTIN E. YOUNG
BY
ATTORNEYS

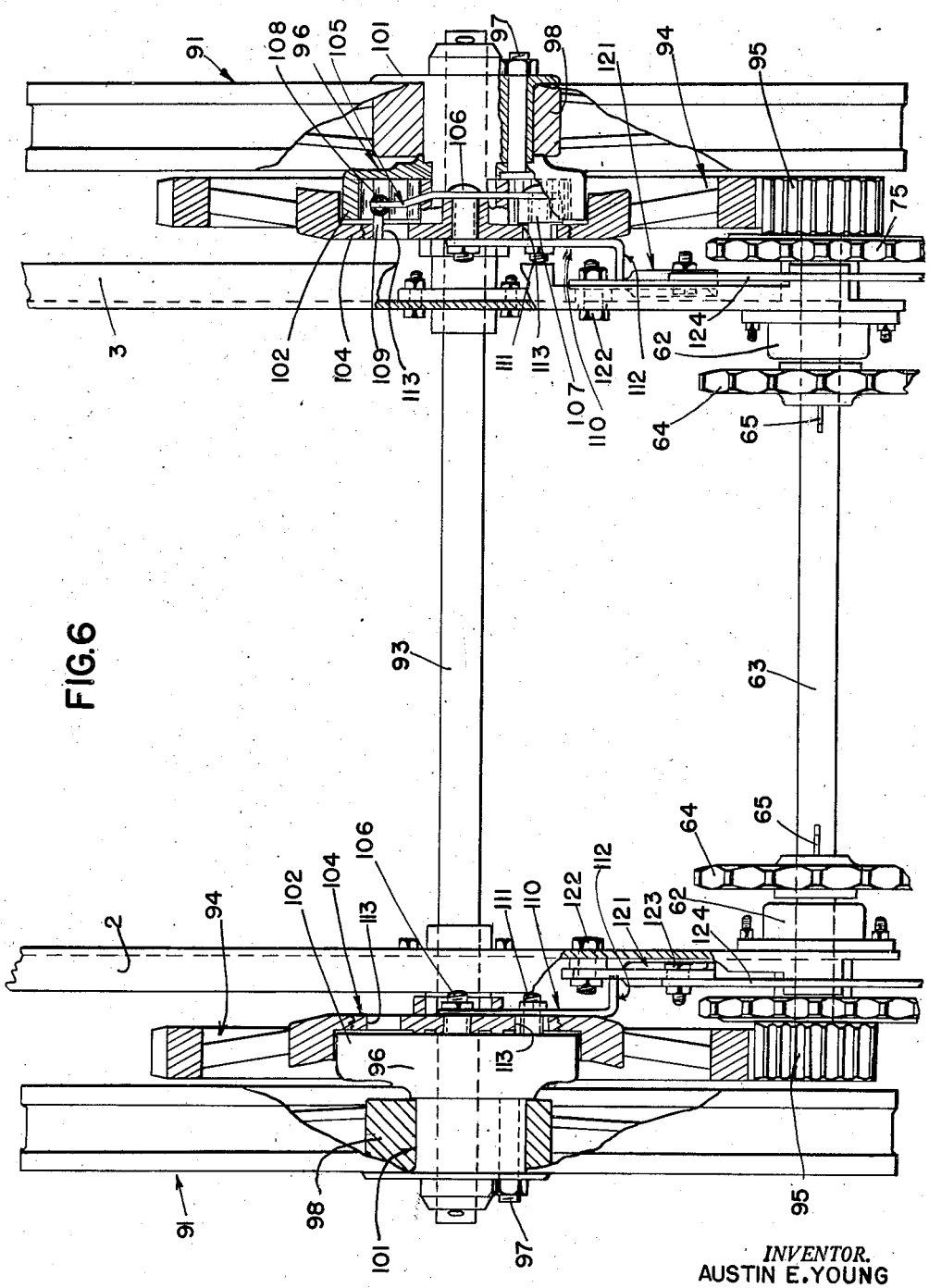

Patented Aug. 26, 1947

2,426,545

UNITED STATES PATENT OFFICE 2,426,545

POTATO DIGGER AND CLUTCH THEREFOR

Austin E. Young, Syracuse, N. Y., assignor to Syracuse Chilled Plow Co., Inc., Syracuse, N. Y., a corporation of New York Application April 26, 1945, Serial No. 590,341

4 Claims. (Cl. 55—51)

This invention relates generally to agricultural machinery and more particularly to potato diggers and other root crop harvesters and the like. The object and general nature of the present invention is the provision of a new and improved potato digger of the traction drive type in which the raising and lowering mechanism, and the rear rack adjusting and control means associated therewith, are simplified. Another feature of this invention is the provision of a new and improved driving connection between the two drive wheels and the means for driving the elevator chain of the digger, whereby the drive is automatically interrupted when the shovel of the digger and the rear rack are raised for transport. More particularly, it is a feature of this invention to provide new and improved means whereby these several operations may be effected by a single control part.

These and other objects and advantages of the present invention will be apparent to those skilled in the art after a consideration of the following detailed description of the preferred construction which is illustrated in the accompanying drawings.

In the drawings:

Figures 1 and 2 are side views of a potato digger in which the principles of the present invention have been incorporated.

Figure 4 is an enlarged view of one of the two identical clutch mechanisms, showing the same in a driving or clutch-engaging position.

Figure 5 is a view similar to Figure 4 but showing the clutch parts in the positions they occupy when the clutch is disengaged, as when arranging the implement for transport.

Figure 6 is a fragmentary sectional view taken generally along the line 6—6 of Figure 1.

Figure 3:
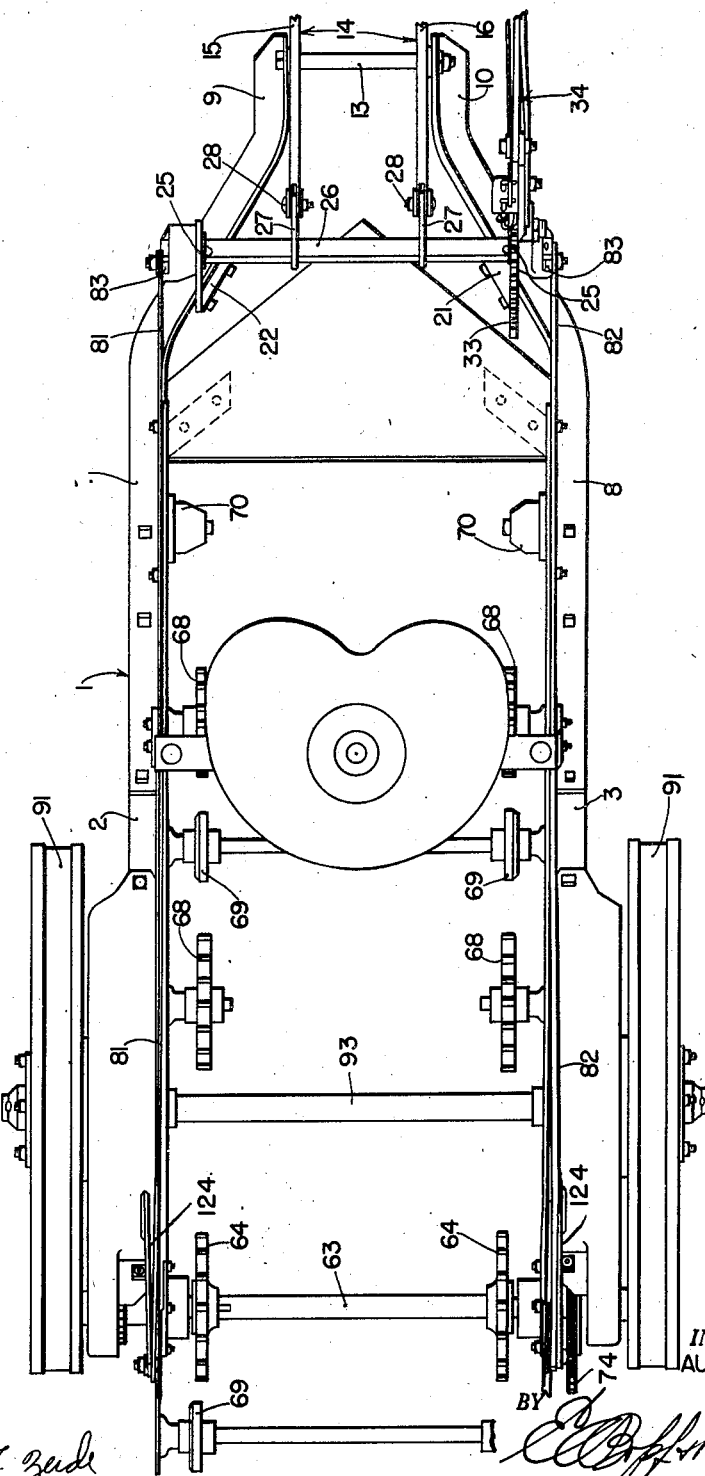
Figure 3 is a plan view of a portion of the implement shown in Figures 1 and 2.

The main frame of the potato digger is indicated in its entirety by the reference numeral 1 and comprises a pair of angles 2 and 3 extending generally longitudinally and at their forward ends carrying a digger shovel 5. The frame 1 also includes a pair of hitch angles 7 and 8 which converge forwardly to form sections 9 and 10 which are apertured to receive a pivot bolt 13 on which a pivot beam 14 is carried. The pivot member 14 includes a pair of strap members 15 and 16, apertured to receive the bolt 13, and secured, as by bolts 17, to a front hitch casting 18. The front end of the latter is formed to be connected either to the drawbar of a tractor or to a tongue truck or other support.

Right and left hand brackets 21 and 22 are bolted, as at 23, to the horizontal converging portions of the frame angles 7 and 8 and extend upwardly and are apertured to receive suitable bearings 25 in which a square cross shaft or rockshaft 26 is supported for rocking movement. A pair of arms 27 are rigidly secured to the central portion of the rockshaft and extend forwardly, being apertured to receive pivot members 28 by which the upper ends of a pair of links 29 are connected thereto. The lower ends of the links 29 are pivoted, as at 31, to the rear ends of the bars 15 and 16. The right hand bracket 21 is extended, as at 33, to form a sector along which an adjusting lever 34 moves. The latter is bolted, as at 36, to an arm 37 but is fixed to the rockshaft 26. The sector 33 is notched and the lever 34 carries conventional detent mechanism 39 whereby the lever 34 may be utilized to lock the rockshaft 26 in different positions, and as will be clear from Figure 1, rocking the rockshaft 26 acts through the arms 27 to raise and lower the rear ends of the hitch member bars 15 and 16 and at the same time raise and lower the front end of the main frame 1 which carries the shovel 5, it being assumed that the hitch casting 18 is supported on a farm tractor or some other propelling means. The angles 7 and 8 are rigidly connected with the main frame angles 2 and 3 by yoke castings 41 which, as best shown in Figure 2, are bolted as at 42 and 43 to the associated angles. Side members 44 are also bolted at a number of points to the main frame angles 2, 3, 7 and 8. A seat arch 45 is bolted, as at 46 and 47, to the angles 7 and 8 and the sides 44 and receives a seat 48. The adjusting lever 34 has a section 50 which may be arranged to extend forwardly, as shown in Figure 2, when the digger is to be operated from the seat of the tractor, or the section 50 may be adjusted to extend rearwardly when it is to be operated by an operator mounted on the seat 48.

A rear rack 55, made up of a pair of sides 56 and frame bars 57, is pivoted, as at 58, to a pair of brackets 59 which are carried by a pair of bearing brackets 61. The latter receives bearing members 62 carrying a transverse drive shaft 63 on which a pair of sprockets 64 are fixed, as by a key 65 or the like. A potato chain 66 of conventional construction is trained over the sprockets 64, which drive the chain, and similar sprockets 67 and 68, and supporting rollers 69 and 70 carried at various points on the main frame angles 2 and 3 and the rear rack bars 57. Rotation of the sprockets 64 drives the potato chain. The rear sprockets 67 also drive the potato chain and are fixed as by a key 71 to a rear shaft 72 journaled for rotation in suitable bearing brackets carried by the rear rack bars 57. A sprocket 73 is fixed to the outer end of the shaft 72 and receives a driving chain 74 which is trained at its front portion over a sprocket gear 75 fixed to the right end of the drive shaft 63. The rear rack is provided at its rear with a pair of deflectors 77 mounted in place by attaching bars 78. The rear rack swings vertically about the bolts 58 as an axis and is raised and lowered concomitantly with the raising and lowering of the shovel 5 by means of a pair of links 81 and 82 which are pivotally connected at their forward ends to right and left hand arms 83 which are fixed to the ends of the forward rockshaft 26. The rear end of each of the links 81 and 82 is provided with a plurality of apertures 85 to receive a pivot bolt 86 carried at the upper forward corner of each of the rear rack side sheets 56. The elevation of the rear end of the rack 55 for any particular setting of the hand lever 34 may be adjusted by placing the bolts 86 in any one pair of the openings 85. In this way, the elevation of the rear end of the rack 55 may be kept as low as may be desirable or necessary.

The main frame 1 is supported on a pair of ground wheels 91 which are mounted for rotation on an axle shaft 93. Fixed to each end portion of the axle shaft 93 is a drive gear 94, and each drive gear 94 is in mesh with a pinion 95 which is fixed to the outer end portion of the potato chain drive shaft 63. Each of the ground wheels 91 is mounted on a hub member 101 to which a drum member 96 is secured, as by bolts 97 which pass through the hub 98. The member 101 has a scalloped flange 102 which lies close to the hub portion 104 of the adjacent drive gear 94. The hub construction 104 of each of the gears 94 carries a clutch dog 105 pivoted, as at 106, to the drive gear. Each of these clutch dogs or pawls extends generally in a tangential or circumferential direction, one end having a roller 107 mounted on a bolt or pin 11 and the other end apertured to receive the one end of a spring 108, the other end of which is anchored, as at 109, to a part of the drive gear hub 104. The spring 108 exerts a bias tending to swing the roller 107 out into engagement with one of the scallops 102 carried by the ground wheel hub 101, which, as best shown in Figure 4, establishes a driving connection between the ground wheel 91 and the associated drive gear 94. There is a similar clutch construction at the other side of the potato digger and the drive gears 94 are fixed to the shaft 93 in such position that the pivoted clutch dogs 105 are disposed in identical positions with respect to the axle 93 and, of course, their pivot axes 106 are axially aligned. Each clutch dog 105 also includes an arm 110 connected to the inner part of the dog 105 by the pivot 106 and by the bolt 111 that extends through one of the slots 113 in the gear hub 104. Each arm 110 has an extension 112 lying adjacent the periphery of the flange 102, and it will be noted, particularly from Figure 4, that the clutch dogs 105, extending generally circumferentially or tangentially, are adapted to transmit the driving force, when the wheel 91 rotates in the direction of the arrow in Figure 4, from the wheel 91 to the associated drive gear 94, but if for any reason one of the ground wheels should be rotated faster than the other, then the latter wheel is permitted to rotate slower than the other ground wheel since the clutch dog 105 is permitted to overrun the associated ground wheel. This occurs on turns. When both wheels rotate at the same speed the drive from the wheels is transmitted to the driven shaft 63 through both clutches. It will be noted that no other ratchet mechanism is required, as to permit one ground wheel to lag behind the other as when making turns, since each clutch dog 105 is especially arranged to accommodate turning.

Both clutches may be disconnected simultaneously by means of a pair of control members 121, pivoted as at 122, to each side of the main frame 1. The outer or swinging end of the control arm 121 is pivoted to receive a bolt 123 which connects an operating link 124 thereto. Each operating link 124 extends upwardly and rearwardly and is pivoted to the bolt 86 on the rear rack 55, the bolts 86 also being the points of connection between the rear rack 55 and the links 81 and 82.

In operation, when it is desired to raise the shovel 5 into its transport position the operator swings the lever 34 rearwardly. This raises up on the rear end of the hitch beam 14 and thus raises the front end of the potato digger by raising the pivot connection 13, the digger frame pivoting about the axis of the ground wheels 91. At the same time, the counter clockwise movement of the arms 83 exerts a forward pull through the links 81 and 82 against the upper portion of the rear rack 55, thus swinging the rear end of the latter, including the deflectors 77, upwardly and preventing the rear end of the rack from striking the ground when the front end of the main frame and the shovel 5 are raised. The forward movement of the upper forward portion of the rear rack results in a downward and forward movement of the operating links 124, the lower ends of which are connected to the swingable members 121. After the shovel 5 and the rear end of the rear rack 55 have been raised into their transport position both of the swingable members 121 are moved downwardly into a position to engage the associated extension 112 on the clutch dog 105 at that side of the digger. Since the clutch dogs are mounted in the same position, one with respect to the other, about the axle shaft 93, it will be seen that the members 121, when moved downwardly, simultaneously disengage both clutch dogs 105 from the driving engagement with the scalloped portion 102 of the associated drive wheel 91. This timed relation as regards simultaneously disengaging both clutch dogs is desirable in order to prevent the possibility of disengaging one clutch while leaving the other engaged. Normal raising and lowering of the rear end of the rack 55 when the operating depth of the shovel 5 is adjusted does not move the operating arms 121 into a clutch-disengaging position.

While I have shown and described above the preferred structure in which the principles of the present invention have been incorporated, it is to be understood that my invention is not to be limited to the particular details shown and described above but that, in fact, widely different means may be employed in the practice of the broader aspects of my invention.

What I claim, therefore, and desire to secure by Letters Patent is:

1. A potato digger comprising means serving as a main frame and carrying a potato chain, ground wheels supporting said frame means, a vertically swingable rear rack pivoted to the rear portion of said frame and including upwardly disposed sides, an adjusting lever swingably mounted on said main frame means and link connected with the upper portions of the sides of said rear rack, whereby movement of said adjusting lever raises and lowers said rack, disconnect clutch means for controlling the drive between said ground wheels and said potato chain, and links extending from the upper portions of said rack sides to said disconnect clutch for operating the latter.

2. In a potato digger, a main frame, an axle connected therewith, ground wheels rotatably mounted on the ends of said axle, a driving member fixed to each wheel, a pair of driven members fixed to said axle and disposed adjacent said driving members, a pair of clutch dogs pivoted to each of said driven members in substantially identical positions with respect to said axle, each clutch dog including a part extending laterally outwardly beyond the periphery of said driving and driven members and each clutch dog being adapted to engage the associated driving member whereby the latter may drive the driven member, spring means acting against each clutch dog for urging it into engaging position, and a pair of members pivoted to said main frame and swingable into and out of a position in which both will simultaneously engage the outwardly extending portions of said clutch dogs for moving said clutch dogs simultaneously into a position disconnecting the drive from said driving members to said driven members.

3. In a potato digger, means serving as a main frame, a driven shaft mounted for rotation transversely of said frame means, an axle shaft also journaled for rotation on said frame means generally parallel to said driven shaft, a driving gear member fixed to each end portion of said axle shaft, a pair of driven gear members fixed, respectively, to the end portions of said driven shaft and meshing, respectively, with said drive gears, a clutch dog member pivoted to the hub portion of each of said drive gears and having an operating section extending beyond the hub portion of the associated drive gear, said clutch dog member extending in a generally tangential direction and the extending portions of said clutch dogs and the pivot axes of said clutch dogs being, respectively, in register, a pair of driving wheels rotatably mounted on the end portions of said axle shaft and having parts adapted, respectively, to engage said driving dogs when the latter are swung radially in a direction to establish the drive, spring means acting against said clutch dogs for urging them into engagement with the associated wheel-carried driving part, and means movably mounted on said frame means and adapted to engage the extended portions of said clutch dogs simultaneously for simultaneously disengaging the clutch dogs from said wheel-carried driving parts.

4. The invention set forth in claim 3, further characterized by said clutch dogs being arranged so that said extended portions lie generally tangentially rearwardly of the respective pivot connections between the clutch dogs and the gear members whereby if one ground wheel should be driven faster than the other, the clutch dog associated with said other wheel will ratchet relative to the driving part carried by said other wheel.

AUSTIN E. YOUNG.

REFERENCES CITED

The following references are of record in the file of this patent:

UNITED STATES PATENTS

| Number | Name | Date |
| --- | --- | --- |
| 1,014,394 | Hist | Jan. 9, 1912 |
| 1,477,676 | Waterman | Dec. 18, 1923 |
| 1,715,198 | Hist | May 28, 1929 |
| 2,077,462 | Cook | Apr. 20, 1937 |